US006195935B1

(12) United States Patent
Bellucci et al.

(10) Patent No.: US 6,195,935 B1
(45) Date of Patent: Mar. 6, 2001

(54) BIODEGRADABLE PLANT PROTECTOR AND GROWTH ENHANCEMENT DEVICE AND METHOD

(76) Inventors: Joseph P. Bellucci, 48 San Souci Dr., Pawling; James F. Bellucci, 11A Shadybrook La., Bedford Hills; Michael R. Bellucci, 50 San Souci Dr.; John A. Bellucci, 60 San Souci Dr., both of Pawling, all of NY (US) 12564

( * ) Notice: Subject to any disclaimer, the term of this patent is extended or adjusted under 35 U.S.C. 154(b) by 0 days.

(21) Appl. No.: 09/379,191

(22) Filed: Aug. 20, 1999

(51) Int. Cl.[7] .................................................. A01G 7/00
(52) U.S. Cl. ............................................................. 47/9
(58) Field of Search ................................ 47/56, 23, 25, 47/26, 24, 9

(56) References Cited

U.S. PATENT DOCUMENTS

| D. 280,979 | * | 10/1985 | Groth ................................. D11/130 |
| 3,252,251 | * | 5/1966 | Simmons .................................. 47/9 |
| 4,207,705 | | 6/1980 | Errede et al. ......................... 47/48.5 |
| 4,348,218 | | 9/1982 | Bond, Jr. ..................................... 71/1 |
| 4,794,726 | | 1/1989 | Fawcett et al. ............................ 47/9 |
| 5,058,317 | * | 10/1991 | McMurtrey .............................. 47/25 |
| 5,274,951 | | 1/1994 | Besing ..................................... 47/56 |
| 5,323,558 | | 6/1994 | Baumler ................................... 47/40 |
| 5,389,116 | | 2/1995 | Byrd ........................................ 47/58 |
| 5,396,731 | * | 3/1995 | Byrne ...................................... 47/25 |
| 5,421,123 | | 6/1995 | Sakate et al. ............................ 47/56 |
| 5,425,204 | | 6/1995 | Holmes et al. .......................... 47/84 |
| 5,464,455 | | 11/1995 | Molnar ................................. 47/1.01 |
| 5,507,845 | | 4/1996 | Molnar et al. ........................ 47/1.01 |
| 5,647,951 | * | 7/1997 | Bayer .................................. 156/62.2 |
| 5,651,214 | | 7/1997 | Zucker et al. ........................... 47/74 |
| 5,706,605 | | 1/1998 | Alcazar et al. ...................... 47/65.7 |

* cited by examiner

*Primary Examiner*—Charles T. Jordan
*Assistant Examiner*—Judith A. Nelson
(74) *Attorney, Agent, or Firm*—Milde, Hoffberg & MacKlin, LLP

(57) ABSTRACT

A biodegradable mat is disclosed for protecting and enhancing the growth of plants. The mat is in circular, sinusoidal or linear form and comprises a plant food, soil fertilizer, soil enricher, soil supplement, insecticide, fungicide, herbicide and/or animal repellant. The circular mat has a hole in the center for the stem of a plant and a radial slit extending from the hole to the circle circumference. The mat is placed on the ground adjacent and around the stem of a plant. It is then covered with a layer of soil and/or mulch and moistened to release the active ingredients.

34 Claims, 8 Drawing Sheets

BIODEGRADABLE PLANT PROTECTOR AND GROWTH ENHANCEMENT DEVICE AND METHOD

BACKGROUND OF THE INVENTION

1. Field of the Invention

The present invention relates to a device and method for promoting plant growth through use of a convenient and environmentally friendly mat. The mat serves as an alternative to bulk purchases and human handling of plant foods, soil conditioners and related plant products.

2. Description of Prior Art

Improved plant growth and soil enrichment is one of the major concerns in the plant industry. There are numerous products on the market today which accomplish both. In the past adding fertilizers, soil conditioners and mulches either alone or in conjunction with other products were the means of accomplishing this end.

The U.S. Pat. No. 4,794,726 discloses an "aluminum flake mulch" which promotes plant and seed growth through light reflection, mulching and a fertilizing agent. This device sits above the ground, is meant to be reused and is not biodegradable. The aluminum flake surface of this device is exposed and is consequently unsightly, especially in a plant setting. The device does not contain soil conditioners to aid in microorganism growth or other plant supplements. In addition, it is not a convenient "use and forget" device for the average gardener or landscaper.

The "ground cover and soil supplement" device disclosed in the U.S. Pat. No. 5,389,116 provides a way of adding nutrients to the soil but is more concerned with delivering a consistent mulch material, in mass, for planting beds in a way that does not move, needs no border and leaves "holes" where plants occur. Like the "aluminum flake mulch", this device sits above the ground and is intended to last as long as possible. It is held together by a binder which is not water soluble.

There are also devices, such as the "vegetation mat" disclosed in the U.S. Pat. No. 5,421,123, which contain plant seeds, mulch and fertilizer materials either in rolls or strips or loosely packaged in bags which are useful for seed germination but have no value when planting shrubs, trees, flowers, seedlings or potted plants.

None of these devices or methods provide a means for delivering plant food, soil conditioners and other related plant and soil products in a pre-packaged, biodegradable form that not only eliminates the handling of these materials by the gardener, but also provides a quick and easy way of accomplishing a multitude of valuable tasks for the plant.

Furthermore, these known devices are not intended or readily adapted for use in plant containers of the type in which plants are grown by a nursery or which are sold with a newly purchased plant.

Finally, such general purpose devices are not readily adapted to aiding the growth of specific existing plants, which require specific fertilizers, soil supplements and the like.

SUMMARY OF THE INVENTION

It is a principal object of the present invention to provide a device and method which will improve plant growth and soil composition.

It is a further object of the present invention to provide a device and method which will protect a plant against loss of water through evaporation from the soil and/or protect a plant against frost or other environmental effects.

It is a further object of the present invention to provide a device and method of the type described above which is simple and easy to use.

It is a further object of the present invention to provide a device and method of the type described above which is safe to use.

These objects, as well as other objects that will become apparent from the discussion that follows, are accomplished, in accordance with the present invention, by providing a plant protector and growth enhancement device in the form of a biodegradable mat which can be placed adjacent to and/or around a plant, either on top of the soil or, preferably, immediately below a thin (¼ inch to 1½ inch) layer of soil and/or mulch material. When in place, the mat protects the plant and promotes the growth of the plant in a variety of ways:

The mat contains plant-specific fertilizer, in both type and amount, for the particular plant for which the mat is intended.

The mat improves soil quality by providing a soil conditioner (organic matter, either synthetic or naturally occurring) for microorganism growth.

The mat allows water and air to pass through easily and yet serves as a moisture retention device for the plant roots.

The mat moderates soil temperature keeping it cooler in the summer and warmer in the winter, which enhances plant development and extends the growing season of the roots.

The mat provides weed control immediately around the plant.

The mat contains a plant growth enhancement mix that may include insecticides, fungicides, animal repellents, weed retarding agents and other plant related commercially available products to perform those services these products were made for.

The mat provides short-term erosion control immediately around the plant and ensures that the fertilizer and the soil conditioner remain in the vicinity of the root ball.

According to one preferred embodiment of the present invention, the plant protector and growth enhancement device comprises three layers, namely:

(a) A first layer of weblike first material having a plurality of passages which permit the passage of air and water therethrough but are sufficiently small to prevent the passage of sandlike granular material. This first material is capable of naturally biodegrading when placed in the soil.

(b) A second layer of loose, granular second material for enhancing plant growth. This second layer is also porous to air and water and is capable of naturally biodegrading when placed in the soil.

(c) A third layer of weblike third material having a plurality of passages which permit the passage of air and water therethrough but are sufficiently small to prevent the passage of sandlike granular material. This third material is also capable of naturally biodegrading when placed in the soil.

The first and third layers are connected together to form a sandwich-like mat with the second layer between them. This mat is then suitable to be placed on or in the soil adjacent to a plant to protect the plant and enhance its growth.

Advantageously, both the first layer and the third layer comprise an outer layer and an inner layer. These two layers are made of different materials: the outer layer being relatively thicker and stronger, and the inner layer being capable of biodegrading at a substantially faster rate than the outer layer. The purpose of the outer layer is to provide strength to the mat. It can be made of burlap, cotton or wool, preferably burlap. The purpose of the inner layer is to prevent the granular material of the second layer from leaking out. This inner layer can be made of paper, cardboard or biodegradable plastic, preferably a non-woven paper tissue which readily disintegrates upon the application of moisture.

The passages for water and air in the outer layer are preferably larger than those of the inner layer. The passages in the outer layer may be as large as 0.2 inches whereas the passages in the inner layer must be substantially smaller to retain the loose, granular material, for example, up to 0.1 inches.

The second layer, which comprises the loose, granular material, may include a plant food such as "Miracle-Grow"; a soil fertilizer, such as an NPK mix; a soil enricher, such as Milorganite; and a soil supplement of any type. Furthermore, the second layer may advantageously include an insecticide, a fungicide and/or a herbicide. It may also include an animal repellant, such as a deer repelling or raccoon repelling material. Such products are available from Espoma, Scotts, Ropell, Preen, Jonathan Green, Ortho and others.

Principally, the first and third layers are moisture absorbent so as to accept and hold moisture for the plant and to inhibit its evaporation from the soil adjacent to the plant.

Advantageously, the first and third layers are made of a material which inhibits frost or at least moderates the temperature of the soil.

The first and third layers are advantageously connected together along seam lines to form pockets for the loose granular material of the second layer. These seam lines connecting the first and third layers together may be made by stitching and/or by means of an adhesive.

Advantageously, the pockets which are at different distances from the plant when the mat is in place may contain different granular material depending upon their distance from the plant. In this way, light fertilizer material may be placed close to the plant whereas stronger fertilizer may be placed at a distance from the plant to prevent root burning.

In its preferred embodiment, the first and third layers forming the mat are substantially coextensive and have substantially the same external dimensions.

In one embodiment, the first and third layers are in the shape of a circle having a hole at the center to admit the stem of the plant when the mat is in place. A radial slit extending from this hole outward to the circle circumference allows the mat to be placed around a plant.

In another embodiment, the first and third layer are in the shape of a linear strip which may be placed along one side of a row of plants. A second linear strip may be placed on the opposite side.

In still another embodiment of the device according to the invention, the first and third layers are in the shape of a sinusoidal strip which may be passed back and forth on either side of a row of a plants.

In another, advantageous embodiment of the invention, the mat may be formed as a continuous structure, without layers. In particular, the mat may comprise the "active material", which forms the second layer in the first embodiment described above, held together by a water soluble binder, such as a gel. The active material may comprise one or more of a plant food, a soil fertilizer, a soil enricher, soil supplements, an insecticide, a fungicide, an herbicide, an animal repellant and the like.

The mat according to the invention is preferably used by placing it on the ground adjacent to and around the stem of a plant. Thereafter, the mat is covered with a layer of soil and/or mulch, preferably in a thickness in the range of ¼ inch to 1½ inches. Finally, water is poured onto the soil and mulch so as to moisten the mat and allow its active ingredients to dissolve and/or to percolate.

It will be understood that while the mat according to the invention provides both short and long term benefits to the plant and to the soil, it is safe and easy to handle. The mat eliminates the need to buy and store, in larger than necessary quantities, fertilizers and soil conditioners.

The mat may be anchored with readily available landscape pins when used on extreme slopes. The mat may be used by the home gardener, the serious landscaper or the commercial nursery grower. It may be used for very young plants, established plants and even plants in containers (nursery stock).

The mat can be used by the commercial grower in his container or field dug plants preventing fertilizer from being lost when watering or lost in handling the plant material (spilling out or over sides) in addition to providing all the benefits found when used in the garden or landscape setting.

The mat can be made in many sizes so as to be able to cover the root system of small plants as well as large ones.

In addition to all of the advantages elucidated above, the mat provides for surface root protection from shovels and other intrusions. Finally, the mat eliminates the possibility of root burn from improper fertilization techniques.

For a fuller understanding of the present invention, reference should now be made to the detailed description of the preferred embodiments, taken in conjunction with the various figures of the accompanying drawings.

DESCRIPTION OF THE PREFERRED EMBODIMENTS

Figure 1:
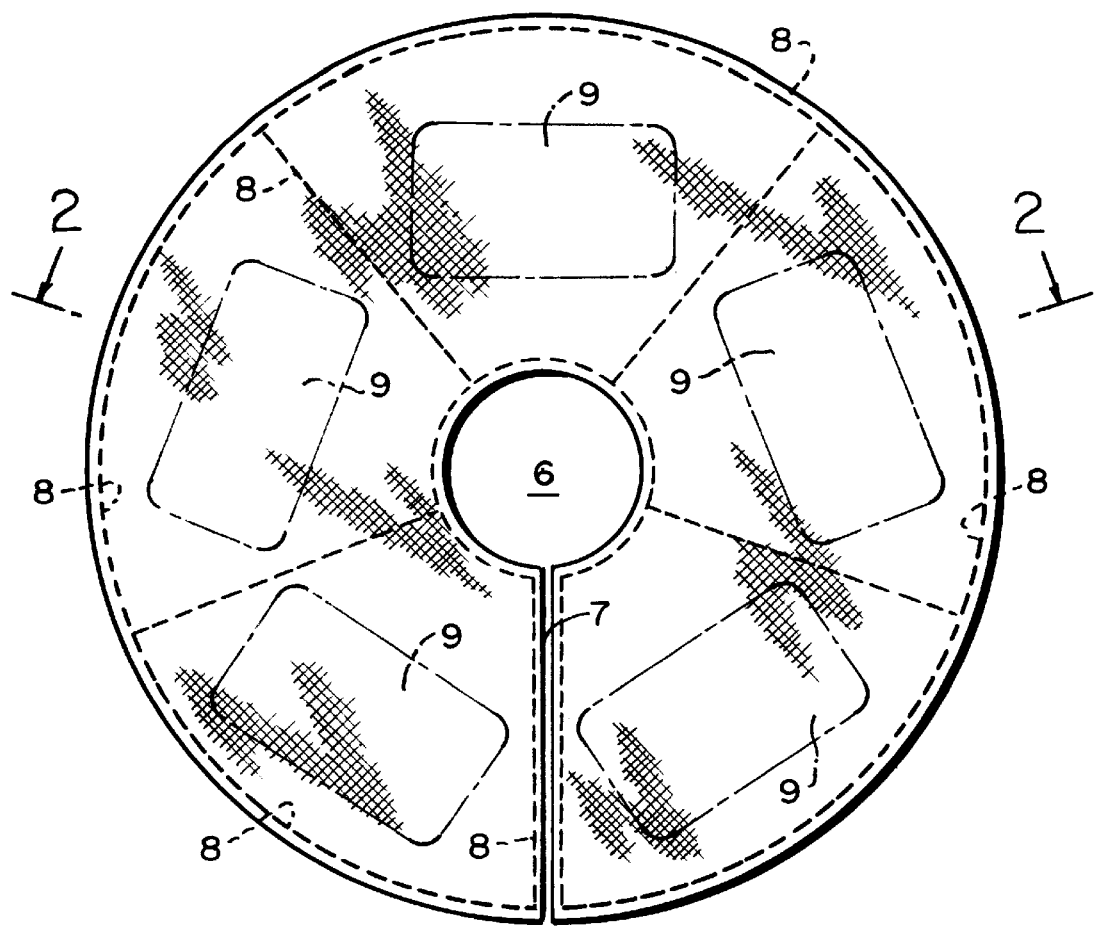
FIG. 1 is a top view of the plant protector and growth enhancement mat according to a first preferred embodiment of the invention.

The preferred embodiments of the present invention will now be described with reference to FIGS. 1–14 of the drawings. Identical elements in the various figures are designated with the same reference numerals.

FIGS. 1–4 illustrate a plant protector and growth enhancement mat according to a first preferred embodiment of the present invention. As shown in FIG. 1, the mat comprises an outer burlap type material 5, glued or stitched or fastened by a similar means as shown by 8, to an inner layer of paper type material. This gluing or stitching may form lines, curved or otherwise as shown by 8, or may be evenly distributed between the layers.

A central plant base hole 6 has a radial cut 7 running from it to the outer edge of the mat. Area 9 indicates a typical location under which the inside mix of fertilizer, soil conditioner, etc . . . would be found. The dotted lines 8, representing glue or stitch lines, serve not only to hold the mat together but also serve to keep the inner mix stationary or at least with minimal movement. The seams 8 may form "pockets" to hold the inner, active granular mixture at specific locations.

Figure 2:
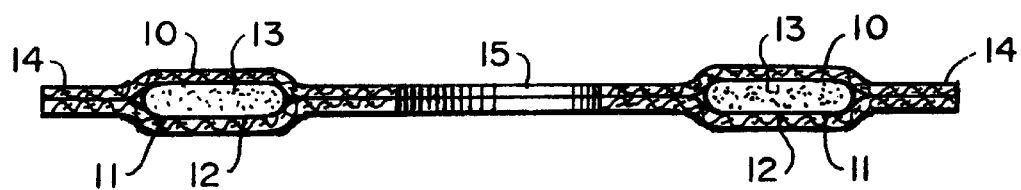
FIG. 2 is a cross-sectional view of the mat of FIG. 1.

In FIG. 2, the cross-sectional view, the outer burlap 10 is fastened to the inner paper-lined layer 12 with glue or stitching 11. The inside fertilizer and soil conditioner mix 13 is held to minimal or no movement with stitching or glue 14. The central hole for the plant, 15 is closed as is the outer edge of the mat by glue or stitching 14.

Figure 3:
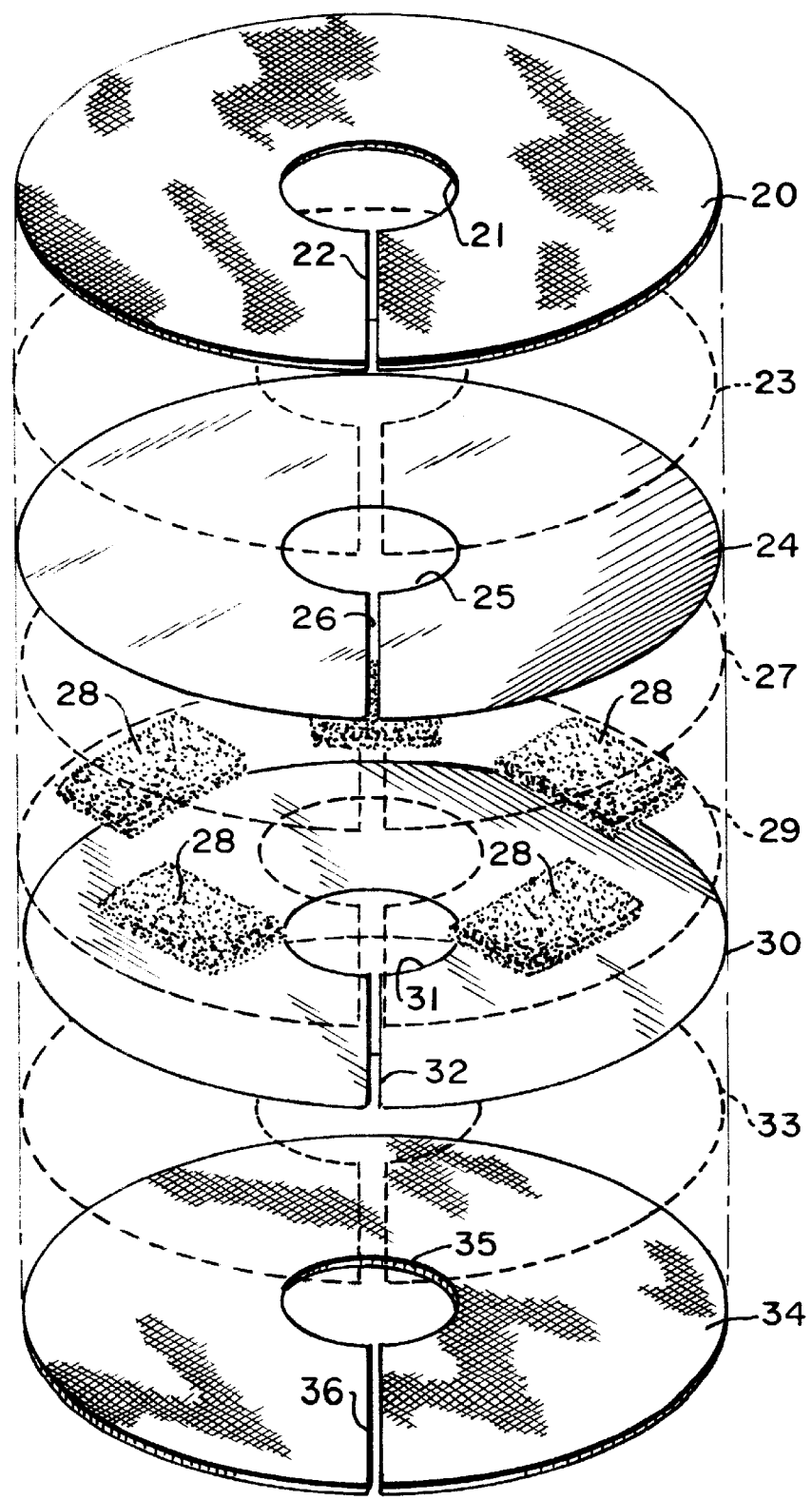
FIG. 3 is a detailed, exploded view of the various layers comprising the mat of FIG. 1.

In FIG. 3, the outer burlap type material 20 with central hole 21 and radial cut 22 is joined to inner paper layer 24 using glue or stitching 23. Glue and or stitching 27 binds paper liner 24 to fertilizer, soil conditioner mix 28 as well as to paper liner 30. Paper liner 24 has a central hole 25 and a radial cut 26. Paper liner 30 has central hole 31 and radial cut 32. Paper liner 30 is joined by glue and or stitching 29 to mix 28 and paper liner 24. Paper liner 30 is joined to outer burlap liner 34 with glue and or stitching 33. Outer burlap liner 34 has a central hole 35 and radial cut 36.

Figure 4:
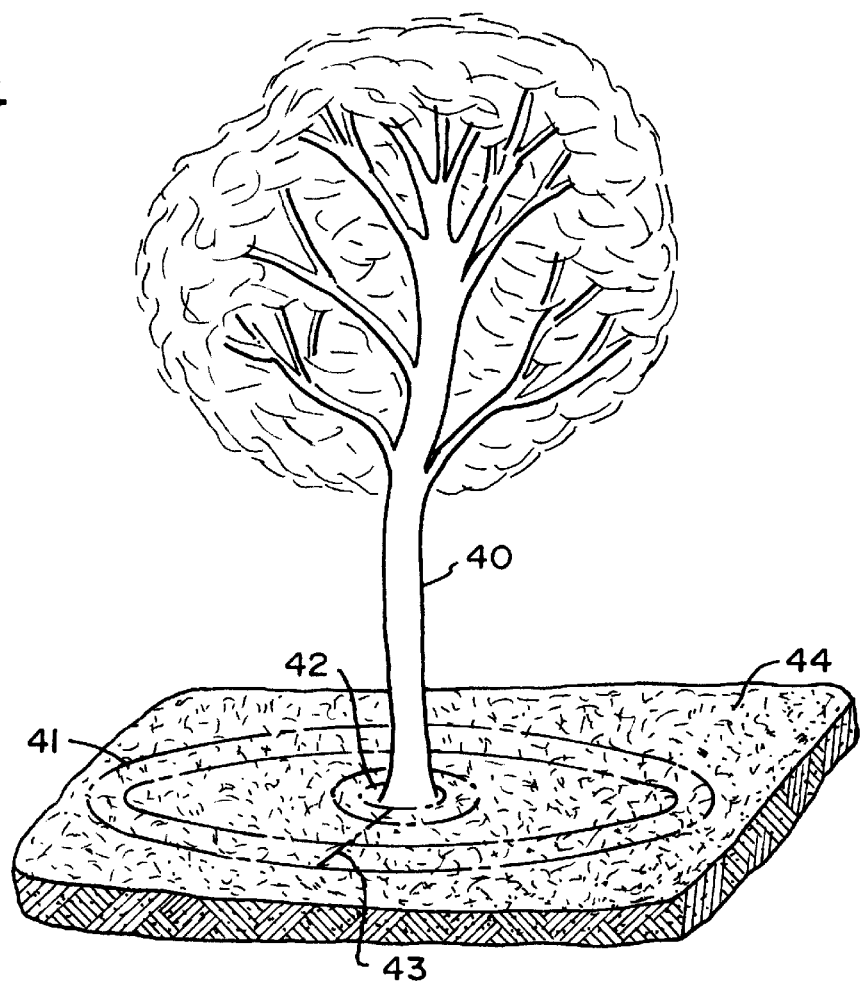
FIG. 4 is a perspective view of the mat of FIG. 1, in use around a plant.

In FIG. 4, the perspective view shows a typical plant (tree, shrub or flower) as designated 40. The mat 41 according to the invention is shown with a layer of soil or other organic matter 44 covering it. The center plant hole 42 has the radial cut 43 running from it.

Figure 5:
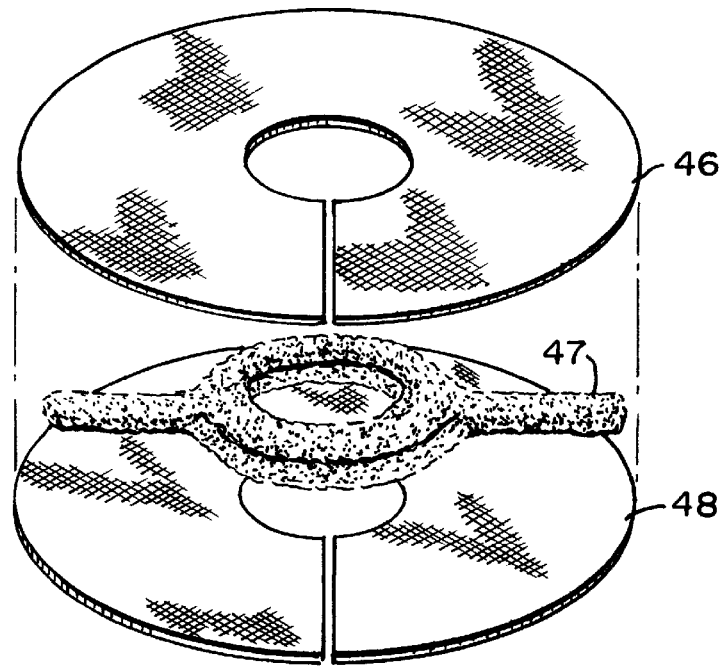
FIG. 5 is an exploded view of a plant protector and growth enhancement mat according to a second preferred embodiment of the invention.

FIG. 5 shows a second preferred embodiment of the present invention wherein the inner and outer layers on opposite sides of the mat are formed from a single mix of materials. In this case, the materials (such as burlap, cotton, wool or paper) are glued together and must have passages therethrough which are small enough to retain the loose, granular material of the inner layer. In FIG. 5, the layers are: a first layer 46 of weblike material having a plurality of passages which permit the passage of air and water therethrough but are sufficiently small to prevent the passage of sandlike granular material; a second layer 47 of loose, granular material for enhancing plant growth; and a third, outside layer 48 of weblike material, preferably substantially identical to the material of layer 46.

Figure 6:
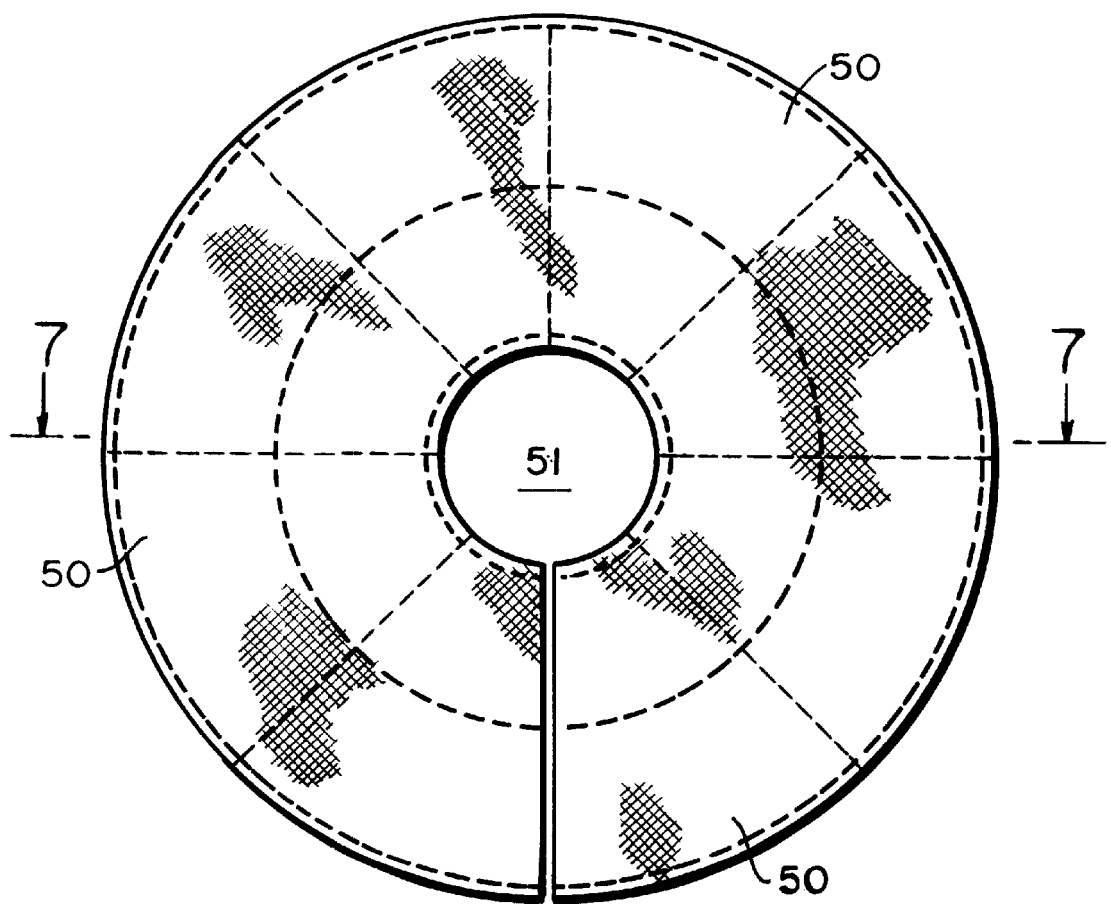
FIG. 6 is a top view of the first and/or second preferred embodiment of the mat according to the invention which comprises a plurality of pockets for active material.
Figure 7:
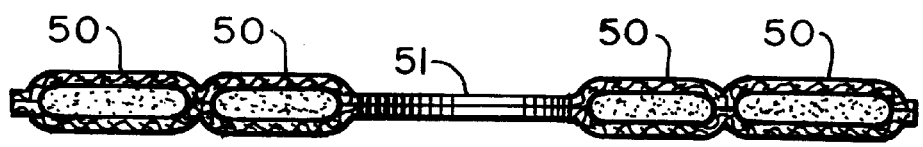
FIG. 7 is a cross sectional view of the mat of FIG. 6.

FIGS. 6 and 7 show, in top view and cross sectional view, respectively, the first and second embodiments of the mat which has been stitched and/or glued along seam lines to form a plurality of pockets 50. The loose granular material—that is the active material for the mat—is contained in individual ones of these pockets. Advantageously, the active material may have a different composition depending upon whether it is close to or farther away from the central hole 51 for the stem of the plant. For example, the nitrogen content of the fertilizer may be reduced in the pockets closest to the plant and increased in the outer pockets.

Figure 8:
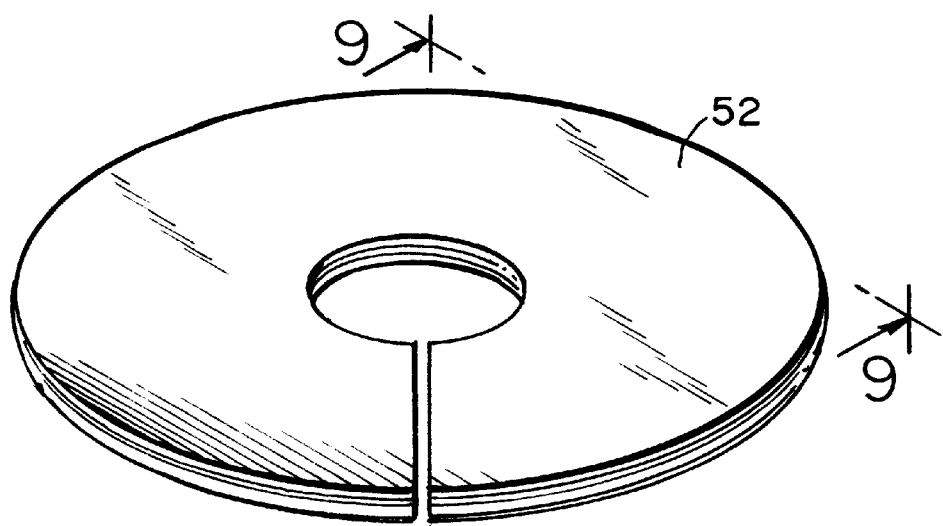
FIG. 8 is a perspective view of the plant protector and growth enhancement mat according to a third preferred embodiment of the invention.
Figure 9:
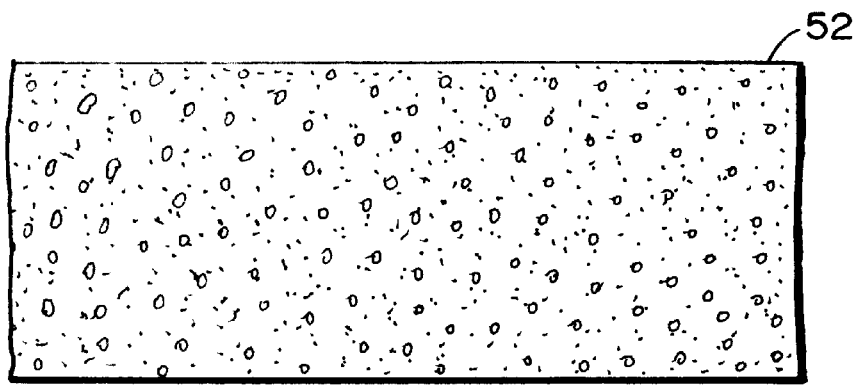
FIG. 9 is a cross sectional view of a portion of the mat of FIG. 8.

FIGS. 8 and 9 show a plant protector and growth enhancement device according to a third preferred embodiment of the invention. In this embodiment, the loose, granular material is bound together by a water soluble gel to form an integral, flexible mat 52. Again, the mat of FIG. 8 is shown in a circular configuration having a central hole and a radial slit.

The materials utilized in all three embodiments of the present invention are biodegradable; that is, they eventually disintegrate when placed in the soil.

Figure 10:
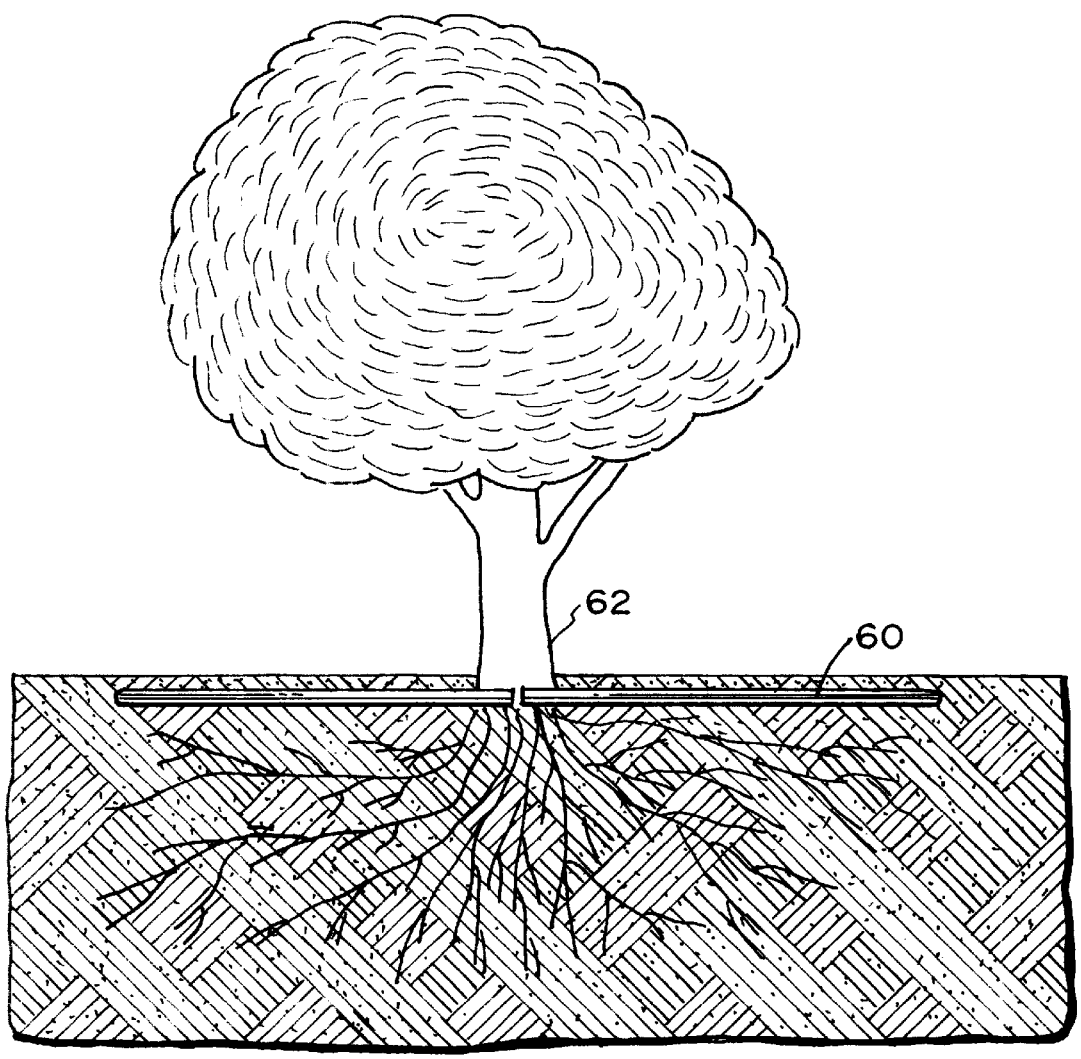
FIG. 10 is a perspective view of the mat of FIGS. 1, 5 or 8, showing the mat in place around a tree.
Figure 11:
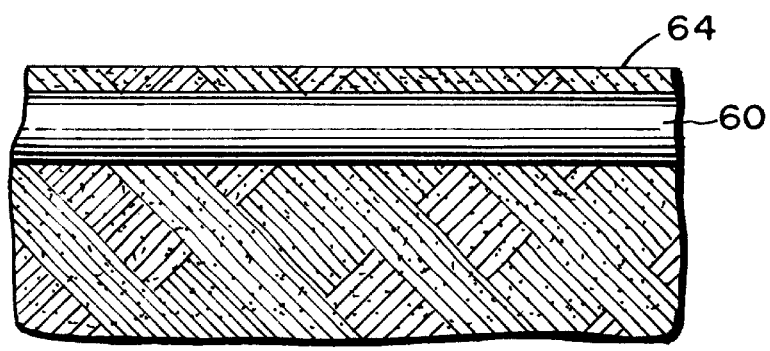
FIG. 11 is a cross sectional view of a portion of the mat of FIG. 10 with soil applied to the top surface.

FIG. 10 and FIG. 11 illustrate how the mat is used in place in an outside environment. In this case, the mat 60 surrounds a seedling 62. As shown in FIG. 11, soil and/or mulch 64 is placed on top of the mat 60. The soil and/or mulch preferably has a thickness in the range of a ¼ inch to 1½ inches. After placing the mat 60 on the ground around the seedling 62 and after placing the soil 64 atop the mat 60, the soil and mat are moistened with water by pouring water around the stem of the seedling.

Figure 12:
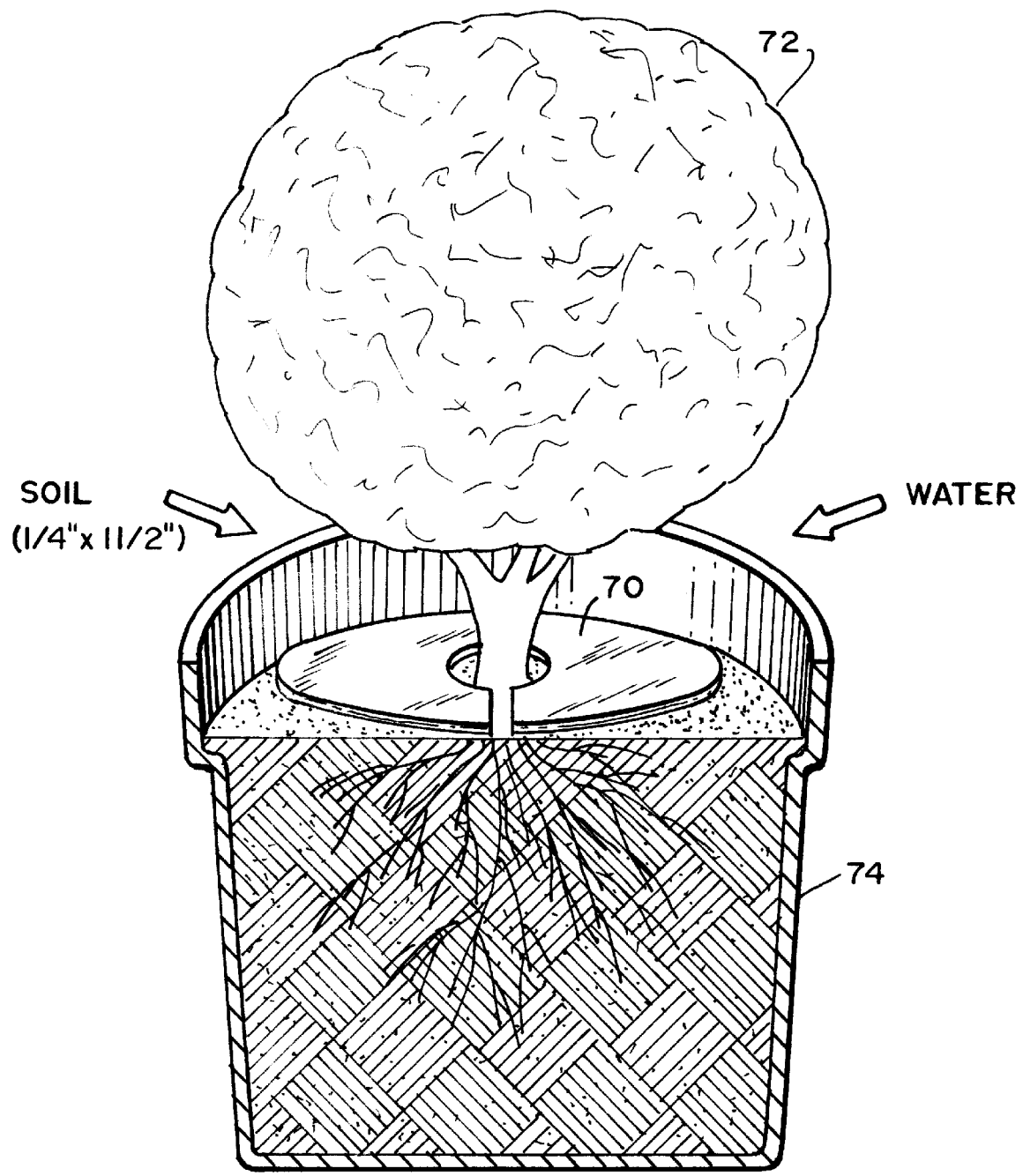
FIG. 12 is a cross sectional diagram showing use of the mat according to the invention with a plant contained in a pot.

FIG. 12 illustrates the use of the mat 70 according to the invention for a plant 72 contained within a pot 74. As in the case with the outdoor environment, illustrated in FIGS. 10 and 11, the soil and water are applied to the mat.

Figure 13:
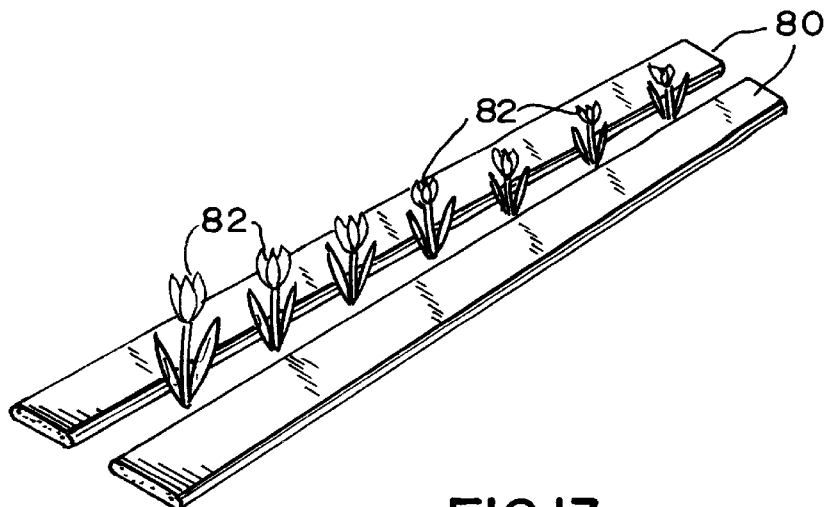
FIG. 13 is a perspective view showing two linear mats arranged on opposite sides of a row of plants.
Figure 14:
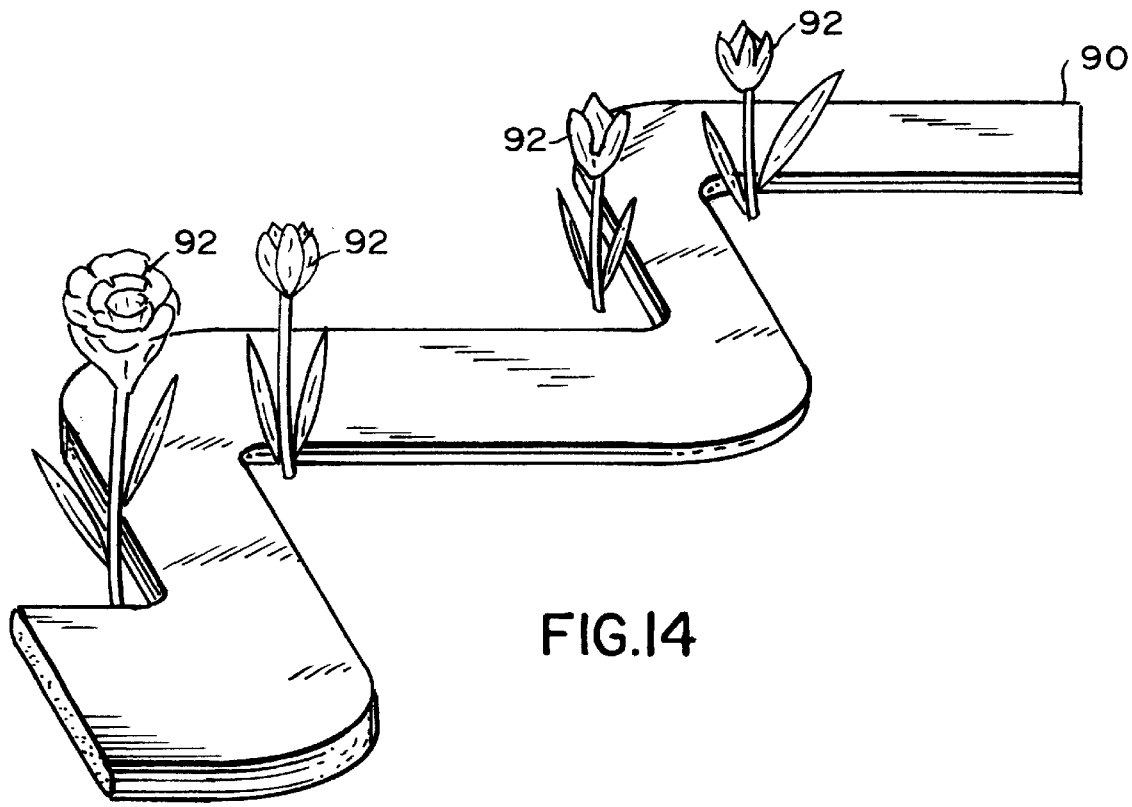
FIG. 14 is a perspective view showing a sinusoidal shaped mat which weaves back and forth along a line of plants.

FIGS. 13 and 14 illustrate mats 80 and 90 in use in an garden environment. In FIG. 13, the mats 80 are linear in shape and placed on opposite sides of a row of plants 82. In FIG. 14, the mat 90 is sinusoidal in shape and it extends back and forth about a linear row of plants 92.

There has thus been shown and described a novel biodegradable plant protector and growth enhancement device and method which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A biodegradable plant protector and growth enhancement device comprising, in combination:

(a) a first layer of weblike first material having a plurality of passages which permit the passage of air and water therethrough but are sufficiently small to prevent the passage of sandlike granular material, said first material being capable of naturally biodegrading when placed in the soil;

(b) a second layer of loose, granular second material for enhancing plant growth, said second layer being porous to air and water and being capable of naturally biodegrading when placed in the soil;

(c) a third layer of weblike third material having a plurality of passages which permit the passage of air and water therethrough but are sufficiently small to prevent the passage of sandlike granular material, said third material being capable of naturally biodegrading when placed in the soil;

wherein said first and third layers are connected together and form a sandwich-like mat with the second layer between them;

whereby said mat is adapted to be placed on or in the soil adjacent to a plant to protect the plant and enhance its growth.

2. The plant protector and growth enhancement device of claim 1, wherein said first layer comprises a first outer layer and a first inner layer, said first outer layer and first inner layer being made of fourth and fifth materials, respectively, said fifth material being capable of biodegrading at a substantially faster rate than said fourth material.

3. The plant protector and growth enhancement device of claim 1, wherein said third layer comprises a third outer layer and a third inner layer, said third outer layer and third inner layer being made of sixth and seventh materials, respectively, said seventh material being capable of biodegrading at a substantially faster rate than said sixth material.

4. The plant protector and growth enhancement device of claim 2, wherein said third layer comprises a third outer layer and a third inner layer, said third outer layer and third inner layer being made of said fourth and said fifth materials, respectively;

whereby said third layer is substantially identical to said first layer.

5. The plant protector and growth enhancement device of claim 4, wherein said fourth material and said fifth material have different porosities, the passages of said fifth material being sufficiently small to prevent the passage of said granular material from said second layer.

6. The plant protector and growth enhancement device of claim 5, wherein said passages in said fourth material have a size in the range of 0 to 0.2 inches.

7. The plant protector and growth enhancement device of claim 5, wherein said passages in said fifth material have a size in the range of 0 to 0.01 inches.

8. The plant protector and growth enhancement device of claim 1, wherein said second material comprises a plant food.

9. The plant protector and growth enhancement device of claim 1, wherein said second material comprises a soil fertilizer.

10. The plant protector and growth enhancement device of claim 1, wherein said second material comprises a soil enricher.

11. The plant protector and growth enhancement device of claim 1, wherein said second material comprises a soil supplement.

12. The plant protector and growth enhancement device of claim 1, wherein said second material comprises an insecticide.

13. The plant protector and growth enhancement device of claim 1, wherein said second material comprises a fungicide.

14. The plant protector and growth enhancement device of claim 1, wherein said second material comprises a herbicide.

15. The plant protector and growth enhancement device of claim 1, wherein said second material comprises an animal repellant.

16. The plant protector and growth enhancement device of claim 1, wherein said first and third layers are moisture absorbent.

17. The plant protector and growth enhancement device of claim 1, wherein said first and third layers inhibit evaporation from the soil when the mat is placed on the soil.

18. The plant protector and growth enhancement device of claim 1, wherein said first and third layers inhibit frost when the mat is placed on the soil.

19. The plant protector and growth enhancement device of claim 1, wherein said first and third layers are connected together along seam lines to form pockets for said second material of said second layer.

20. The plant protector and growth enhancement device of claim 19, wherein said pockets are at different distances from the plant when the mat is in place, and wherein different second material is placed in different ones of said pockets.

21. The plant protector and growth enhancement device of claim 1, wherein first and third layers are connected together along seam lines by means of stitching.

22. The plant protector and growth enhancement device of claim 1, wherein first and third layers are connected together along seam lines by means of an adhesive.

23. The plant protector and growth enhancement device of claim 1, wherein said first and third layers are substantially co-extensive and have substantially the same external dimensions.

24. The plant protector and growth enhancement device of claim 1, wherein the first and third layers are in the shape of a circle with a radial slit extending outward to the circle circumference from a point at substantially the circle center.

25. The plant protector and growth enhancement device of claim 1, wherein the first and third layers have a hole at the center for the stem of a plant when the mat is in place, said radial slit extending outward from said hole.

26. The plant protector and growth enhancement device of claim 1, wherein the first and third layers are in the shape of a linear strip.

27. The plant protector and growth enhancement device of claim 1, wherein the first and third layers are in the shape of a sinusoidal strip.

28. The plant protector and growth enhancement device of claim 1, wherein at least a portion of said first and third layers is made of a material selected from the group consisting of burlap, cotton and wool.

29. The plant protector and growth enhancement device of claim 28, wherein said material is woven.

30. The plant protector and growth enhancement device of claim 1, wherein at least a portion of said first and third layers is made of a material selected from the group consisting of paper, cardboard and biodegradable plastic.

31. The plant protector and growth enhancement device of claim 30, wherein said material is non-woven tissue.

32. The plant protector and growth enhancement device of claim 4, wherein said first outer layer and said third outer layer are made of a material selected from the group consisting of burlap, cotton and wool.

33. The plant protector and growth enhancement device of claim 4, wherein said first inner layer and said third inner layer are made of a material selected from the group consisting of paper, cardboard and biodegradable plastic.

34. The plant protector and growth enhancement device of claim 33, wherein said paper is non-woven tissue.

* * * * *